Mar. 13, 1923.

O. MIETZELFELD

CAMERA

Filed Jan. 21, 1916

WITNESSES:

INVENTOR.
Otto Mietzelfeld

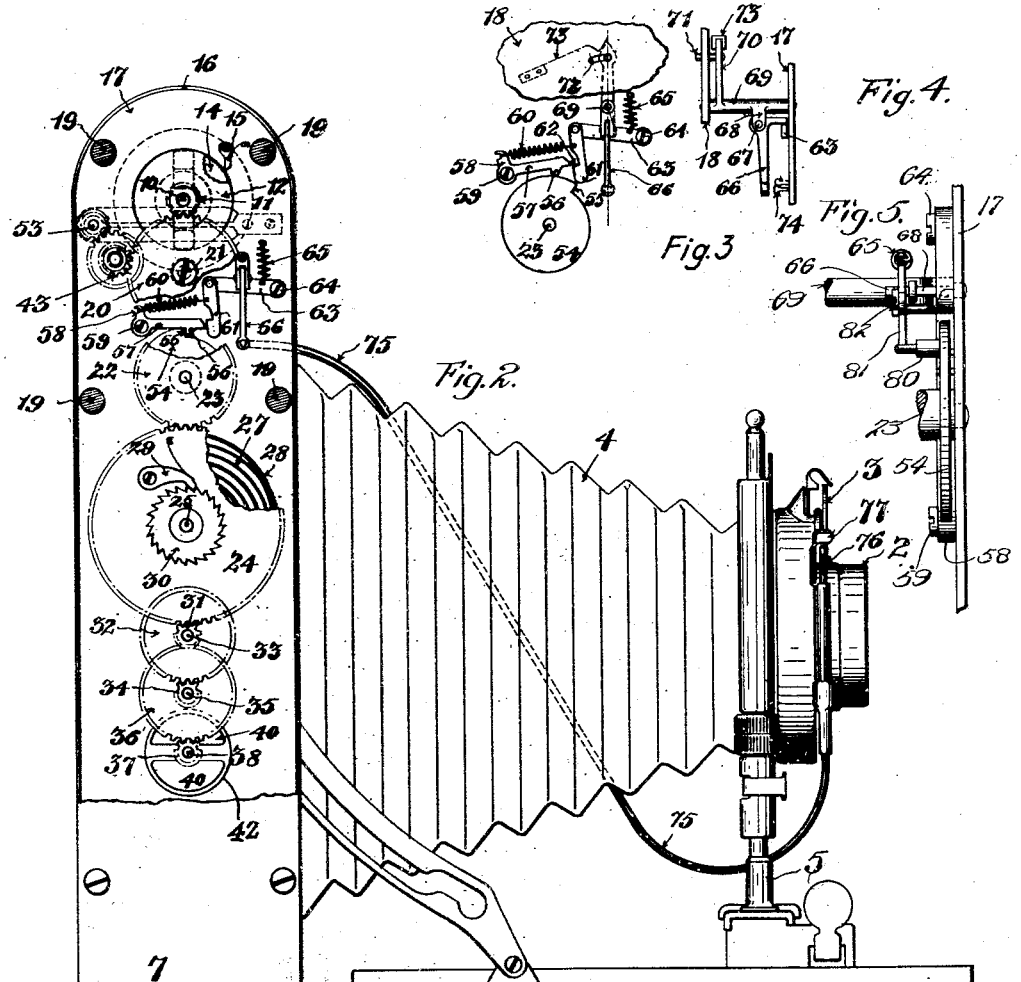

Patented Mar. 13, 1923.

1,448,414

UNITED STATES PATENT OFFICE.

OTTO MIETZELFELD, OF NEW YORK, N. Y., ASSIGNOR TO ADOLPH E. BRION, OF NEW YORK, N. Y.

CAMERA.

Application filed January 21, 1916. Serial No. 73,288.

*To all whom it may concern:*

Be it known that I, OTTO MIETZELFELD, a citizen of the United States, and a resident of the city of New York, county of Kings, and State of New York (whose post-office address is No. 1607 Union Street, Brooklyn, New York), have invented a new and useful Improvement in Cameras, of which the following is a specification.

The object of my invention is to modify a film camera wherein the film may be shifted automatically, immediately after the exposure for a picture.

As a result of my invention, not only is double exposure of any portion of the film avoided, but a high speed in the setting and shifting of each portion of the film is made possible, so that a succession of separate and distinct exposures of the film can be made practically as fast as the photographer can, with any degree of accuracy, sight one object after another and actuate the shutter for pictures thereof. With this improvement, an object in fairly quick motion can be recorded at various distances, where otherwise it would get beyond the range of the photographer after the first attempt. On account of the rapidity of this mechanism, the now obsolete pneumatic means to actuate the shutter is not favored, for the simple reason that, aside from its inconstancy and undependability, it will not keep up with the speed that can here be encountered in the shiftings of the film. For this reason, I have resorted to purely solid means, and which is also positive acting, although the former conventional bulb for air pressure may be attached to actuate the shutter, if so desired, at the risks, however, before mentioned.

My invention may be applied principally to either a box or folding camera using a film roll or other flexible sensitized medium in roll form, and which camera is adapted through its shutter mechanism to take any of the so-called instantaneous, bulb or time exposures. An important feature of the invention lies in the arrangement whereby the setting and the actuating of the shutter for any one of these three kinds of exposures, will of itself be sufficient to fully control and set in operation at the proper time the automatic film shifting mechanism, which will act only after a picture has been taken and the shutter finally closed; in other words, this shifting mechanism automatically obeys the shutter in every instance and with no more attention than is necessary to take the picture.

There is another feature in my invention whereby the film may be shifted by hand at once at any stage without interfering with the automatic mechanism or with the proper passage of the film, and there are other means and dispositions designed to make this kind of a camera foolproof and practical from every point of view. Yet, without sacrifice to any of these benefits, I have made my construction both simple and with careful avoidance of multitudinous parts, desiring to have this modified camera, in both weight and size, resemble as nearly as possible the ordinary camera now in use. The spring motor that I employ, when fully wound, is designed to give sufficient power to wind at least an entire film of the conventional maximum length, and so that the last portion of the film shall be wound with the same intensity as the first portion. For such a strong spring, I had to devise a brake that could positively keep this power within the proper speed limit, to avoid principally injury to the film, and yet arrange it so that it will effectively and permanently act within the lines of the strictly limited space allotted to the rest of the mechanism.

These and other objects are accomplished by my invention, some embodiment of which is hereafter more particularly set forth.

For a more particular description of my invention, reference is to be had to the accompanying drawings, forming a part hereof, in which, Fig. 1 is a rear elevation, partially in section, of a camera provided with my improvement.

Fig. 2 is a side elevation of the same, with parts removed to more clearly reveal the structure involved.

Fig. 3 is a side elevation showing a portion of the releasing mechanism.

Fig. 4 is an end elevation of the same.

Figs. 5 and 6 show a modified detail of construction.

Throughout the various views of the drawings, similar reference characters designate similar parts.

Figure 1:
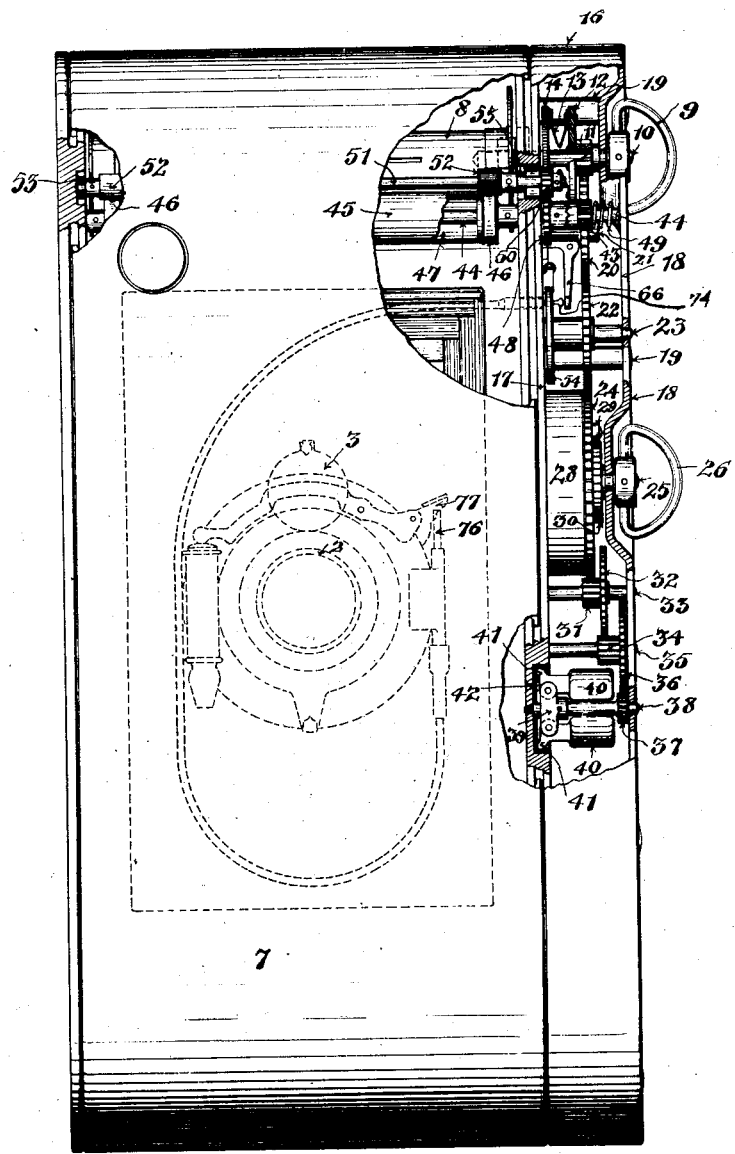

The kind of a camera to which my improved film shifting mechanism may be applied is here designated generically by the character 1. Such a camera has a lens holder 2 with its attendant parts, a shutter mechanism 3 and, in the better class of cameras, a bellows 4 with a support 5 rising from the hinged front 6. The front 6 is suitably connected to a casing 7 of the conventional kind, and in which are mounted at both ends the usual rollers 8 for films, one to supply and the other to take on the film, in the conventional manner. The take-on roller 8 is connected to its handle 9 in the conventional manner, and may be turned by hand through this handle when the automatic mechanism is not in use, and without interfering with said mechanism. This handle 9 is connected to the roller 8 by means of a suitable spindle 10 to which it is fixed, and this spindle has loosely mounted thereon a small pinion 11, which is fixed to a disk 12 provided with a number of springs 13, with cushions bearing against a disk 14, which is fixed to the spindle 10 and roughened at its outer periphery so as to form teeth for a spring pressed pawl 15, which is pivotally mounted on one of the walls of the outer casing 16, it being understood that this outer casing 16 may be made ether integral with the casing 7 and a part thereof, or may be added thereto, as desired. The casing 16 has parallel walls 17 and 18 united by suitable studs 19, the wall 18 being the outer and the wall 17 the inner.

The pinion 11 meshes with a gear 20 carried by a suitable stud 21 on the side 17, and this gear 20 meshes with an idle gear 22 fixed on a shaft 23 which is free to revolve between the walls 17 and 18, and this last mentioned gear 22 meshes with the main gear 24, which is loosely mounted on the main arbor 25, and this arbor carries at its outer end a handle 26 by which it may be turned. The arbor 25 carries a strong clock spring 27, in the conventional way, and this spring is also connected to the shell 28, which is fixed to the gear 24. The gear 24 also carries a spring pressed pawl 29, mounted in the conventional way so as to connect a ratchet wheel 30, which is fixed on the main arbor 25 and drives the same in the conventional manner. It is obvious from the foregoing that when the handle 26 is turned clockwise the main spring 27 is wound up, and this spring will drive the main gear 24 counter clockwise in the usual way.

Below the gear 24 is a pinion 31, which is fixed to a larger gear 32 and mounted on a shaft 33, and the gear 32 meshes with a corresponding pinion 34 on a stud shaft 35, and this pinion 34 is fixed to a gear 36 which meshes with a pinion 37 on a shaft 38, and the pinion 37 is fixed to this shaft, which also carries a collar 39 with laterally extending ears to which weights 40 are pivotally connected, as shown in Fig. 1, and these weights 40 have laterally extending toes 41, which are adapted to press against a friction disk 42 fixed in a suitable recess in the wall 17 so that the gear 24, through a train of gears, drives the shaft 38, which makes the weights 40 fly away from the shaft 38 and forces the toes 41 against the disk 42 and thereby act as a positive brake to retard the speed of rotation of the gear 24 and all that is driven by it, and keep this speed within due and proper limits.

The gear 20, above described, meshes with a pinion 43, which runs loose on shaft 44 which is free to revolve between the walls 18 and 17 and the wall of the casing 7, as it extends clear across. On this shaft 44 is mounted the measuring roller 45, as shown, and this roller consists of end disks 46, which are recessed to receive the cylinder 47 between said disks and grooved and provided with collars with roughened edges so as to press against the film in the camera, in a manner which will be described below. The shaft 44 is driven from the pinion 43 through a clutch mechanism which will now be described. This clutch mechanism has a gear 48 fixed on the shaft 44, and provided with a set of ratchet teeth which engage corresponding ratchet teeth on the side of the pinion 43, as shown in Figure 1, and these ratchet teeth are normally kept in engagement by a spring 49. The shape of these teeth is such that when the pinion 43 is driven clockwise by the gear 20, the teeth on the side of the gear 48 and those on the side of the pinion 43 are permanently engaged, so that the gear 48 will be driven with said pinion together with the shaft 44 and the measuring roller 45, but when the take-on roller 8 is manually turned by the handle 9, the gear 48 fixed to the roller 45, although made to turn with the roller as usual, by the passing of the film over such roller, will nevertheless revolve disengaged from the pinion 43, the latter then held from turning through the locking of the snail cam as hereinafter mentioned, such disengagement being caused through the structure of the pinion 43, because of the revolution clockwise solely of gear 48, being sidewiped on shaft 44, against the tension of spring 49, owing to the fact that the teeth will in this instance ride off and away from each other.

The gear 48 meshes with a pinion 50 on a shaft or roller 51, which has end collars 52 fixed thereon with roughened surfaces to coact with the roughened edges of the collars on the disks 46, and the gears 50 and 48 are so proportioned that they have the same relative velocity as these roughened edges of the parts 46 and 52, so that the proper speed ratio is always maintained and the film, which passes between the parts 46 and 52, is not subjected to any rubbing. The shaft 51 is mounted in suitable bearings 53 mounted at each end of the casing 7. These bearings are not rigid but have a certain amount of elasticity, so as to automatically take care of films of slightly differing thickness, or variations of thickness in any one film, and are preferably in the form of an elongated bar fixed on the end removed from the shaft 51, as indicated in Fig. 2.

The mechanism for starting and stopping the film shifting mechanism will now be described. The shaft 23 has fixed thereon a snail cam 54, which has a single tooth 55 which normally engages a corresponding tooth 56 of the pivoted pawl 57. This pawl 57 is also provided with a laterally extending arm 58, which is adjacent to the pivot 59 which extends from the wall 17, as shown in Fig. 2. The arm 58 engages a suitable coil spring 60 adapted to keep said pawl normally in a bearing down position, and which spring runs to a detent 61 which near its lower end is provided with a suitable notch or recess 62 adapted when lowered and subsequently elevated by mechanism which will be described below to receive, in the first instance, the end of the pawl 57 and, in the second instance, move the same away from the tooth 55. Immediately after this tooth has been thus cleared it will, by the resulting clockwise rotation of the cam 54, impinge against the lower end of the detent 61 and cause said detent, against the tension of the spring 60, to be separated from the pawl 57 and beyond the possibility of a further engagement with said pawl until said detent is again lowered in the method above described. The detent 61 at its upper end is pivotally connected to a short lever 63, pivoted to the wall 17 at 64, and also connected to the said wall by a suitable coil spring 65 near said pivot, so that this lever 63 is normally kept elevated and the detent 61 is normally kept, as shown in Fig. 2, with its recess clear of the end of pawl 57. When this lever 63 is forced downwardly, as it is momentarily, by mechanism described below, the spring 60 will cause an engagement of the end of the pawl 57 and the detent 61, and then the spring 65, as soon as the depressing force is removed, will momentarily raise the pawl 57 and cause the teeth 55 and 56 to separate. This unlocks the film shifting mechanism, causing the shaft 23 to be driven by the main spring 27, through the connections above described, so as to rotate with the cam attached thereto clockwise. Immediately after the commencement of this rotation the tooth 55 impinges against the lower end of the detent 61 and forces the same away from the pawl 57 against the tension of the spring 60, as above described, and this separation continues only until the pawl 57 and detent 61 are again brought into engagement as described below. During the course of this rotation, the spring 60 will continue to bear down the pawl 57 on the periphery of the cam in peripheral line with the tooth 55, so that after one revolution of the cam, the teeth 55 and 56 will again become engaged and cause the rotation to stop, at which time a predetermined length of the film will have been shifted, such length being uniform with each new operation. To depress the lever 63, as above described, a small bell crank lever 66 is employed, which is fulcrumed at 67 between the ears 68 of an oscillating shaft 69 mounted between the walls 17 and 18. This shaft 69 has a laterally extending arm 70 with a pin or other indicator 71 secured thereto adjacent to and through an opening 72 in the wall 18, so that said pin may be placed on either end of said slot. A suitable leaf spring 73 is secured to the inside of the wall 18 to keep this arm at one limit or other of its movement. In the position shown in Fig. 3, this lever 66 is placed opposite a pin 74, which is connected to a flexible connection 75 which can move this pin in the direction of its length a slight distance so as to cause it to force the bell crank lever 66 to lower the lever 63, as above described. This connection 75 runs to a plunger 76, operating within a suitable bushing against the tension of a spring therein not shown, and which plunger may be impinged by a projection or trigger 77 forming an integral part of the shutter mechanism. It will be noted that if and so long as the trigger depresses the plunger 76, there can be no action with reference to the film shifting mechanism except the engagement of the detent 61 with the pawl 57, because the lever 66 holds the lever 63 in its lower position against the tension of spring 65. As soon as the lever 66 is released through the release of the plunger 76 by the upward and return movement of the trigger 77, so that the spring 65 can become active, the lever 63 is raised and the detent 61 is correspondingly raised, together with the pawl 57, and then the action is as above described. The movements of the trigger 77 are essential to actuate the shutter for an exposure of the film, and these same movements, unaltered, are utilized to synchronously control the operations of the film shifting mechanism in every instance of exposure as hereafter more fully described. This trigger might be, and usually is, controlled from at a distance by the conventional flexible wire connection, similar to 75, the other means of using a bulb to compress air being almost universally discarded, it not being so positive acting.

As stated before, the film shifting mechanism will not automatically be set in operation until the desired picture has been taken and the shutter has been opened and closed, to accomplish which nothing more than what is necessary to set and operate the shutter for an exposure must be done, and this holds good whether an instantaneous, so-called bulb, or time exposure is desired. This is successfully accomplished through the following arrangement, in a recital of which it behooves for a better understanding to explain in more detail the movements of this trigger 77, or its equivalent, as it is regulated for the operation of the shutter in any conventional camera of the type mentioned. For an instantaneous exposure, the shutter will both open and close on the mere depression of said trigger, the time between said opening and closing being infinitesimal and automatically fixed. For a so-called bulb exposure—deriving its name from the length of time that elapses between when a bulb (or other connecting means to the shutter) is gripped and after this grip is released, being really a time exposure brought about through a singular method of operating the shutter—the shutter remains open while the trigger is down, which occurs when the grip is applied, and closes when the trigger returns, which occurs when the grip is released. The depression and release of the plunger on the present wire connection to the shutter gives the same result. For a time exposure, the trigger, when depressed and released (to the extent that it will here return as explained later) will simply open and keep open the shutter without further attention. A second depression and release of the trigger is required to close the shutter, accomplished at the end of any desired length of time for the exposure. In all instances, the automatic film shifting mechanism will not operate until the trigger 77, on its release and return to normal height, passes a certain level. That level is the position immediately below which the shutter either will have closed or will close as the case may be, and above which the automatic film shifting mechanism will be caused to operate. In the instances of instantaneous and bulb exposures, on the release of this trigger, it will immediately return to its normal height, and in its travel bring about the two operations, first that of closing the shutter and second that of starting the film shifting mechanism. In the last instance, however, that of time exposure, the reason that the film shifting mechanism is not set in operation on the first release of the trigger and while the shutter then remains open, is that on this first release the trigger will not, as it is conventionally constructed to work with the shutter, return to its normal height, but will stop at a level below that which will set the film shifting mechanism in operation, because in fact the shutter closing level still lower has not been passed. The second operation and release, however, will allow the trigger to return to its normal height as in the other two cases and cause the operations aforesaid. The necessity for the trigger to pass a certain level on its release before the film shifting mechanism will operate is brought about by the fact that it is necessary for the then extended pin 74, leading by connections from the trigger aforesaid, to relax and withdraw from out of the path of the already moved lower end of said bell crank lever, so as to allow said lever to give sway to the action of spring 65, and unless this withdrawal is made beyond a certain point, said spring will be retarded by said lever from consummating its design to lift the then depressed detent 61 with engaged pawl 57 from out of engagement with the tooth 55 of the cam to bring about an unlocking of the cam and a consequent shifting of the film; and that point is passed by said pin 74 at the same time that the trigger passes the film shifting operating level here mentioned.

In the modification shown in Figs. 5 and 6 a device is added to the apparatus above described by virtue of which it is impossible to open the shutter while the film is being shifted, when the film is shifted from the shutter mechanism. The mechanism comprises a pin 80 placed on the side of the cam 54 a little ahead of the tooth 55, which pin 80, when the automatic mechanism is in normal position and in the position shown in Fig. 6, that is just after the trigger 77 has been depressed, rests against a dog 81 pivoted at 82, which dog is then out of the path of the bell crank lever 66, and this dog is provided with a spring 83 which normally tends to keep it depressed, and the limits of the movements of this dog about its pivot 82, either under the influence of the pin 80 or the spring 83, are determined by a small pin 84, which extends from the partition 17 and projects through a suitable curved slot 85 in the dog 81 as shown in Fig. 6, and the spring 83 is also secured to a pin which extends from said partition. The dog 81 has an ear 86, which is adapted to take over the pin 74 and keep the same from being extended in the direction of its length and from thus pressing against the bell crank lever 66, whenever the dog 81 is off the pin 80. The prevention of this pin 74 from being extended prevents the plunger 76 from being impinged and consequently the trigger 77 from being moved so as to actuate the shutter for an exposure of the film. The interposition of this dog continues while the cam is in rotation and therefore the film being shifted, immediately after which the pin 80 engages the dog 81 and raises the same against the tension of the spring 83 when at or near the position shown in Figs. 5 and 6, bringing and leaving it in that position owing to the stoppage of the cam 54 because of engagement with the pawl 57, and therefore allowing clear space for the lever 66 to be again depressed for shifting a new exposure on the next unexposed portion of the film already placed in position. This arrangement gives added security toward avoidance of double exposure of any one portion of the film, covering in fact the only remaining loophole where a double exposure might take place.

Operation.

In view of the foregoing, the operation of my invention will be readily understood. When loading the camera the photographer, after removing the back cover in the usual way, inserts the supply roll of film at the lower end of the camera in the recess adapted for its reception. He then unwinds a sufficient length of the extended paper film cover preceding the film to reach and be attached to the take on roller in the recess at the upper end of the camera, seeing to it, however that this paper is inserted between the rollers 45 and 51 so that the entire roll of paper and film will always pass between them. He then replaces and locks the removed cover of the camera and proceeds to wind the paper and film by hand through the handle 9 in the usual way until the film is set in position ready for the first exposure as can be determined in the usual way through the shaded window covered aperture in the back of the camera. He then winds the spring 27 through the handle 26 to its full limit so that it will effectually shift the entire length of the film without a rewinding. Assuming the parts to be as shown in Fig. 2 and a film in position, before the picture is taken the shutter mechanism 3 is set in the usual way for an instantaneous or any desired form of time exposure. After the object is sighted in the usual way the trigger 77 is depressed, very often from at a distance through the conventional connecting means, and this depresses the plunger 76 which causes a movement of the bell crank lever 66 and a corresponding depression of the lever 63 and an engagement of the detent 61 with the pawl 57. So long as the shutter mechanism has the trigger 77 depressed the exposure is taking place, except in the case of instantaneous exposure when the depression both opens and instantly closes the shutter completing the exposure instantly, and so long as this trigger 77 remains depressed there is no disengagement between the teeth 55 and 56 at the snail cam 54, so that all parts driven by the main spring 27 remain at rest. As soon as the trigger 77 is raised sufficiently, as before stated, the lever 66 in consequently returning to its normal position allows the spring 65 to raise the lever 63, as above set forth, and after the lever 66 has withdrawn sufficiently, as before stated, the teeth 55 and 56 become disengaged and continue disengaged for one revolution of the cam 54 which will bring about the shifting of a predetermined and uniform length of the film necessary for an exposure. It will be understood that the cam 54 is driven from the gear 22 to which it is connected in any suitable manner, and that this gear receives power from the gear 24 and transmits power to the gear 20, and the gear 20 meshes with the pinion 43 from which the feed rollers 45 and 51 are driven as above described, until the teeth 55 and 56 are again engaged. The take-on roller 8 is also driven by the gear 20 through the pinion 11, and is so arranged that it is always overdriven, that is, it is so driven that there is no slack on the roller 8 under any circumstances, or no slack in the film between this roller and the feed rollers 45 and 51, gripping the film; and this take-on roller 8 is also so arranged that— through the operation of the springs 13 firmly bearing against the face of the disk 14 and slipping around the face of this disk only in equal proportion to the resistance encountered because of the regulated and restricted feeding of the film on to said roller— it loses its relative velocity with the feed rollers 45 and 51, all driven through the gear 20 as aforesaid, to such a degree as will compensate exactly for the increasing diameter of said take-on roller as it winds the film. It will also be understood, as above described, that the governor, acting through the weights 40, prevents an excessive speed, which would otherwise obtain through the power of the spring, and which might injure or destroy the film while being shifted. It is also understood that the film may be wound by hand through the handle 9, whenever desired, without interfering with the remainder of the apparatus, and that in this alternate method the rollers 45 and 51 will revolve as before, co-acting with the passage of the film so as to avoid injury to both rollers and film, and that this is accomplished without any setting whatsoever, through the automatic action of the clutch mechanism, between the pinion 43 and the gear 48, as before stated. When the modification shown in Figs. 5 and 6 is employed, the dog 81 has an ear 86 which may be interposed as above described to prevent the pin 74 from actuating the lever 66 while the cam 54 is in rotation and consequently the film being shifted, and owing to the fact that this pin 74 cannot be extended to actuate the said lever it will be impossible to impinge the plunger 76 and consequently move the trigger 77 to actuate the shutter, thus avoiding double exposure of any portion of the film while it is being shifted.

While I have shown and described some embodiment of my invention, it is obvious that it is not restricted thereto, but is broad enough to cover all structures that come within the scope of the annexed claims.

Having thus described my invention, what I claim is:

1. In a device of the class described, a winding up roller and means for driving the same so as to permit lost motion between the roller and the driving means, feed rollers and means for driving the same so that a predetermined length of film may be driven, said means including a snail cam with means for connecting it to the feed rollers, and means for stopping and starting said cam so that the same may revolve a predetermined distance and no more or less, and mechanism for driving said cam at a predetermined speed.

2. In a device of the class described, a shutter mechanism, suitable for either instantaneous or time exposure, said mechanism containing in its construction a trigger adapted to be directly depressed and released, either once or twice, for opening and closing the shutter, an automatic film shifting mechanism, connecting means for controlling the starting of the film shifting mechanism directly from the shutter mechanism, after the shutter has been closed, and means for preventing the trigger from being operated while the film shifting mechanism is operating.

3. In a device of the class described, a power driven film shifting mechanism with means for linearly measuring and shifting an unlimited length of full-surfaced film predetermined uniform distances, a shutter mechanism and direct mechanical connecting means between the two, controlled by the shutter and including means requiring that the shutter be opened and closed before the shifting mechanism can operate.

4. In a device of the class described, an automatic film shifting mechanism with means for linearly measuring and shifting an unlimited length of film of varied thickness predetermined uniform distances, a take-up roller for winding said film, a shutter mechanism, and mechanical connecting means operatively associated with said shutter mechanism and said film shifting mechanism for controlling the starting of said film shifting mechanism directly from the shutter mechanism, so that predetermined uniform distances of the film may be shifted regardless of the time of operation of said starting control or the amount of film on said roller.

5. In a device of the class described, an automatic film shifting mechanism for shifting a smooth edged film predetermined uniform distances, a shutter mechanism, mechanical connecting means operatively associated with said shutter mechanism and with said film shifting mechanism at all times for controlling the starting of said film shifting mechanism directly from the shutter mechanism, and means operatively independent of said starting control for stopping said shifting mechanism after a predetermined uniform distance of film has been shifted.

6. In a device of the class described, a motor-driven film shifting mechanism, a releasable stop for said motor, a normal shutter mechanism, mechanical connecting means operatively associated at all times between said shutter mechanism and said film shifting mechanism for controlling the starting of said film shifting mechanism directly from the shutter mechanism after the shutter has been opened and closed, and means independent of said shutter mechanism for bringing said stop to stopping position after a predetermined uniform distance of film has been shifted.

7. In a device of the class described, a power-driven film shifting mechanism, a shutter mechanism and direct mechanical connecting means between the two, controlled by the shutter, and including devices interlocking to require that the shutter be opened and closed before the shifting mechanism can operate, and means operatively independent of said shutter or connecting means for stopping said shifting mechanism after a predetermined amount of operation has taken place.

8. In a device of the class described, a rotatable member provided with a shoulder, a pawl normally engaging said shoulder to prevent rotation of the member, a supporting member movable toward and away from the pawl, means for shifting said supporting member in opposite directions and a detent carried by said supporting member arranged in the movement of said member in one direction to engage the pawl and in the movement of said member in the opposite direction to lift the pawl from holding engagement with the shoulder of the rotatable member and said detent having a portion standing in the path of movement of the rotatable member and adapted to be engaged thereby and to be tripped from holding engagement with the pawl.

9. In a device of the class described, a rotatable member provided with a shoulder, a pawl normally engaging said shoulder to prevent rotation of the member, a supporting member movable toward and away from the pawl, means for shifting said supporting member in opposite directions, a detent carried by said supporting member arranged in the movement of said member in one direction to engage the pawl and in the movement of said member in the opposite direction to lift the pawl from holding engagement with the shoulder of the rotatable member and said detent having a portion standing in the path of movement of the rotatable member and adapted to be engaged thereby and to be tripped from holding engagement with the pawl, said detent being pivotally connected with the supporting member and spring means operating to swing the detent toward the pawl and to force the pawl toward the rotatable member.

10. In a device of the class described, a rotatable member provided with a shoulder, a pawl normally engaging said shoulder to prevent rotation of the member, a supporting member movable toward and away from the pawl, means for shifting said supporting member in oposite directions and a detent carried by said suporting member arranged in the movement of said member in one direction to engage the pawl and in the movement of said member in the opposite direction to lift the pawl from holding engagement with the shoulder of the rotatable member and said detent having a portion standing in the path of movement of the rotatable member and adapted to be engaged thereby and to be tripped from holding engagement with the pawl, the means for shifting the supporting member toward the pawl comprising two independently operable instrumentalities.

11. In a device of the class described, a rotatable member provided with a shoulder, a pawl normally engaging said shoulder to prevent rotation of the member, a supporting member movable toward and away from the pawl, means for shifting said supporting member in opposite directions and a detent carried by said supporting member arranged in the movement of said member in one direction to engage the pawl and in the movement of said member in the opposite direction to lift the pawl from holding engagement with the shoulder of the rotatable member and said detent having a portion standing in the path of movement of the rotatable member and adapted to be engaged thereby and to be tripped from holding engagement with the pawl, the means for shifting the supporting member toward the pawl comprising two independently operable instrumentalities, one actuated by shuter mechanism and the other actuated by autograph mechanism.

12. In a device of the class described, a rotatable member provided with a shoulder, a pawl normally engaging said shoulder to prevent rotation of the member, a supporting member movable toward and away from the pawl, means for shifting said supporting member in opposite directions and a detent carried by said supporting member arranged in the movement of said member in one direction to engage the pawl and in the movement of said member in the opposite direction to lift the pawl from holding engagement with the shoulder of the rotatable member and said detent having a portion standing in the path of movement of the rotatable member and adapted to be engaged thereby and to be tripped from holding engagement with the pawl, the means for operating the supporting member including a bell crank lever shiftable into two different operative planes.

13. In a camera of the class described, measuring rolls for positively feeding the film, means for actuating said measuring rolls through a predetermined angular movement to thereby shift the film a measured linear distance, means for automatically controlling the operation of the measuring rolls, mechanism for shifting the film by hand, and connections between said automatic mechanism and said hand mechanism for automatically enabling the shifting of the film either by the automatic mechanism or the hand mechanism and without interference one with the other.

OTTO MIETZELFELD.